US012643809B2

(12) United States Patent
Zhao et al.

(10) Patent No.: US 12,643,809 B2
(45) Date of Patent: Jun. 2, 2026

(54) GLASS PRODUCT FORMING MOLD

(71) Applicant: Changzhou AAC Raytech Optronics Co., Ltd., Changzhou City (CN)

(72) Inventors: Linzhi Zhao, Shenzhen (CN); Jian Wang, Shenzhen (CN)

(73) Assignee: Changzhou AAC Raytech Optronics Co., Ltd., Changzhou City (CN)

( * ) Notice: Subject to any disclaimer, the term of this patent is extended or adjusted under 35 U.S.C. 154(b) by 376 days.

(21) Appl. No.: 17/860,126

(22) Filed: Jul. 8, 2022

(65) Prior Publication Data

US 2023/0391656 A1     Dec. 7, 2023

(30) Foreign Application Priority Data

Jun. 1, 2022     (CN) .......................... 202221358928.3

(51) Int. Cl.
*C03B 11/08*          (2006.01)
(52) U.S. Cl.
CPC ........ *C03B 11/08* (2013.01); *C03B 2215/412* (2013.01); *C03B 2215/46* (2013.01); *C03B 2215/50* (2013.01); *C03B 2215/68* (2013.01)
(58) Field of Classification Search
CPC ............ C03B 2215/44; C03B 2215/68; C03B 2215/414
See application file for complete search history.

(56) References Cited

U.S. PATENT DOCUMENTS

| | | | | |
|---|---|---|---|---|
| 4,481,023 | A | * | 11/1984 | Marechal ................ C03B 11/08 |
| | | | | 65/117 |
| 2010/0290123 | A1 | * | 11/2010 | Yamada ............... G02B 3/0056 |
| | | | | 264/2.7 |

FOREIGN PATENT DOCUMENTS

| | | | | | |
|---|---|---|---|---|---|
| JP | | 4054658 | B2 | * | 2/2008 ........... C03B 11/082 |
| JP | | 4770214 | B2 | * | 9/2011 ............. C03B 11/08 |
| JP | 2011246314 | A | * | 12/2011 | |

OTHER PUBLICATIONS

JP4770214 machine translation, Shimizu Akihiro et al., Manufacturing Method of Glass Lens, Sep. 2011 (Year: 2011).*
JP 2011246314 machine translation, Ogura Kazuyuki et al., Upper Mold for Droplet Molding, Dec. 2011 (Year: 2011).*
JP2004149369 machine translation, Nakahama Masato, Lens connecting part and mold for forming lens array, May 2004 (Year: 2004).*

* cited by examiner

*Primary Examiner* — Queenie S Dehghan
(74) *Attorney, Agent, or Firm* — Wiersch Law Group

(57) ABSTRACT

The present disclosure discloses a glass product forming mold. The mold includes: a lower mold including a first surface and a upper mold including a second surface; the lower mold includes a first forming portion, the upper mold includes a second forming portion corresponding to the first forming portion; the lower mold includes at least one first effluence portion, the first effluence portion is formed by bending from the first surface and is located on the same side of the first surface as the first forming portion. The mold is easy to demold and the product consistency is good.

5 Claims, 8 Drawing Sheets

300

1

100

113

111

112

200

213

211

212

300

313(3132)

313(3131)

311

312

313(3132)

400

500

GLASS PRODUCT FORMING MOLD

TECHNICAL FIELD

The present disclosure relates to the field of optics, and in particular to a glass product forming mold.

BACKGROUND

A lens is an optical element made of a transparent substance (such as glass, plastic, etc.), which can be widely used in security, vehicle, digital camera, laser, optical instruments, and other fields. With the continuous expansion of the market, the application of lens is more and more extensive. Especially with the development of the Internet, various electronic devices are brought into daily lives, such as mobile phones, tablet computers, laptops, etc. Specification requirements of lens applied in those electronic devices are also highly increased.

In the prior art, wafer-level lenses made of glass materials are generally produced by a glass processing mold through thermoforming. When the glass processing mold is enclosed, gaps with a preset shape will be encircled inside the glass processing mold; the gaps can help shape the heated glass substrate, and then the glass substrate is cooled to form glass products with a preset shape. Then, during demolding, the parts near the outer periphery and the parts near the center are prone to demolding errors, resulting in poor consistency of glass products.

SUMMARY

Aiming at the above problems, the present disclosure seeks to provide a glass product forming mold with good demolding and good consistency.

In order to solve the above problems, embodiments of the present disclosure provide a camera optical lens glass product forming mold, comprising: a lower mold comprising a first surface and an upper mold comprising a second surface, the first surface located on a side of the lower mold facing the upper mold, the second surface located on a side of the upper mold facing the lower mold; the lower mold includes a first forming portion for forming a glass product, the first forming portion formed by bending from the first surface, the upper mold includes a second forming portion corresponding to the first forming portion, and the second forming portion formed by bending from the second surface; wherein the lower mold includes at least one first effluence portion, every first effluence portion is formed by bending from the first surface and is located on the same side of the first surface as the first forming portion, and the upper mold includes at least one second effluence portion, every second effluence portion is formed by bending from the second surface and is located on the same side of the second surface as the second forming portion; and wherein when viewed from a direction perpendicular to the first surface, every first effluence portion's connection to the first surface is circular and there is no first forming portion inside the first effluence portion, and when viewed from a direction perpendicular to the second surface, every second effluence portion's connection to the second surface is circular and there is no second forming portion inside the second effluence portion.

As an improvement, both the first forming portion and the first effluence portion bulge from the first surface along a direction toward the upper mold, and at least one bulge height of every first effluence portion is smaller than at least one bulge height of every first forming portion.

As an improvement, both the first forming portion and the first effluence portion dent from the first surface along a direction away from the upper mold, and at least one dent depth of every first effluence portion is greater than at least one dent depth of every first forming portion.

As an improvement, both the second forming portion and the second effluence portion bulge from the second surface along a direction toward the lower mold, and at least one bulge height of every second effluence portion is smaller than at least one bulge height of every second forming portion.

As an improvement, both the second forming portion and the second effluence portion dent from the second surface along a direction away from the lower mold, and at least one dent depth of every second effluence portion is greater than at least one dent depth of every second forming portion.

As an improvement, when viewed from a direction perpendicular to the first surface, every diameter on the first surface of every first effluence portion is smaller than every diameter on the first surface of every first forming portion.

As an improvement, when viewed from a direction perpendicular to the second surface, every diameter on the second surface of every second effluence portion is smaller every diameter on the second surface of every second forming portion.

As an improvement, one first effluence portion is provided at a center of the first surface, and one second effluence portion is provided at a center of the second surface.

As an improvement, there are multiple first effluence portions, one of them being provided at the center of the first surface, and there are multiple second effluence portions, one of them being provided at the center of the second surface.

As an improvement, the number of the first effluence portions is greater than two, and one of the first effluence portions is arranged at a center of the first surface, and the rest of the first effluence portions are arranged at equal intervals on a first circumference centered on a center point of the first surface; and wherein the number of the second effluence portions is greater than two, and one of the second effluence portions is arranged at a center of the second surface, and the rest of the second effluence portions are arranged at equal intervals on a second circumference centered on a center point of the second surface.

As an improvement, the lower mold includes a plurality of sub-forming regions, and the first effluence portions are provided in the plurality of sub-forming regions.

As an improvement, the sub-forming regions are fan-shaped with an even number and are arranged around a center point of the first surface, and shapes of the sub-forming regions are defined by line segments that extend from a center point of the first surface to pairs of edge points of the first surface.

As an improvement, the sub-forming regions are rectangular and are arranged in a matrix on the first surface.

The beneficial effects of the present disclosure are as follows. The glass product forming mold provided by the present disclosure can reduce the surface stress of the glass product by setting the effluence portions to release the excess pressure during the molding process, and at the same time form a gap between the glass substrate and the surface of the mold, reduce the resistance during demolding, and improve the consistency of the glass products.

BRIEF DESCRIPTION OF DRAWINGS

To more clearly illustrate the technical solutions in the embodiments of the present disclosure, accompanying drawings that need to be used in the description of the embodiments will briefly introduce in following. Obviously, the drawings described below are only some embodiments of the present disclosure. For Aa person of ordinary skill in the art, other drawings can be obtained according to these without creative labor, wherein.

DETAILED DESCRIPTION OF EMBODIMENTS

Figure 1:
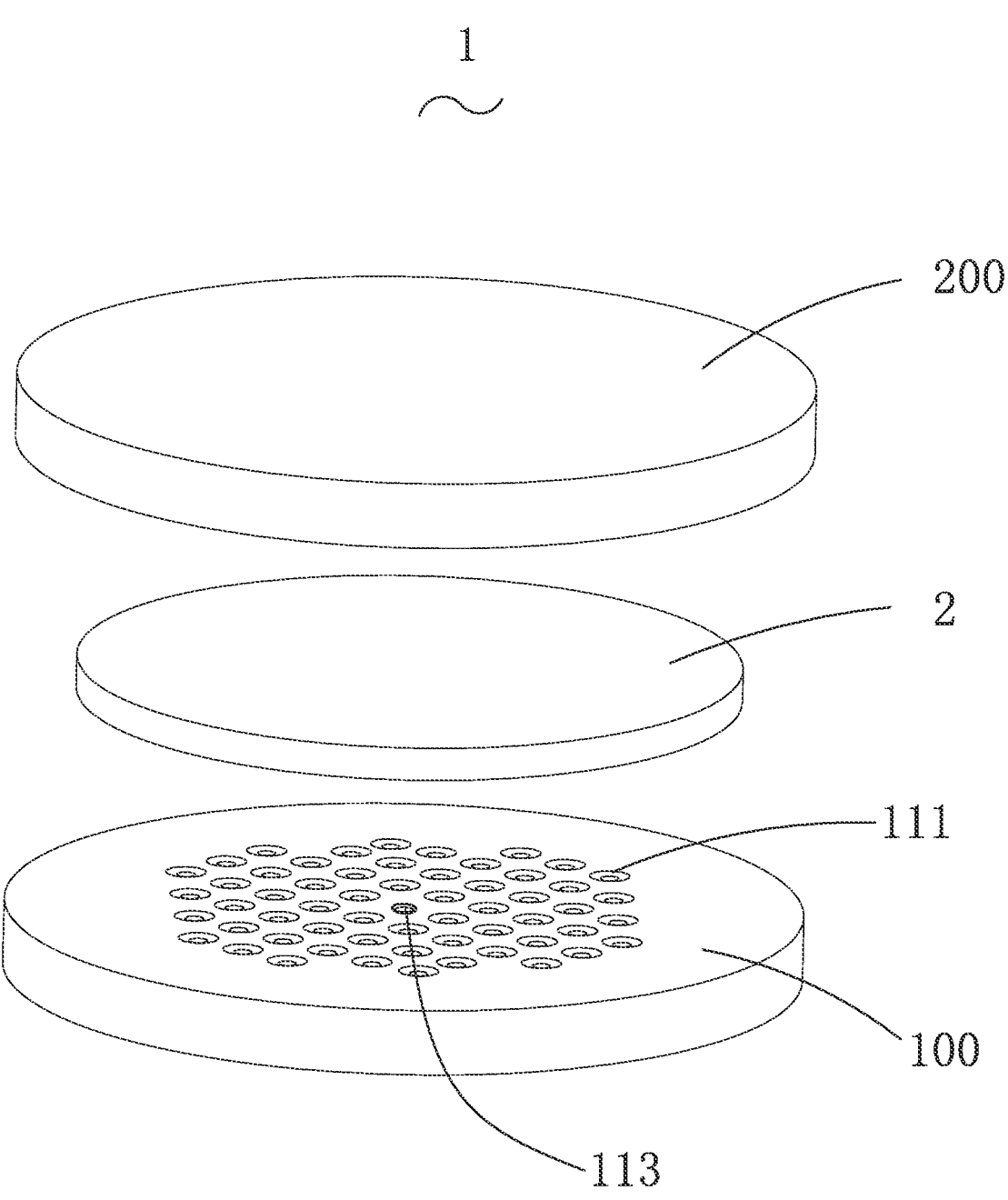
FIG. 1 is a schematic diagram of a structure of a glass product forming mold according to a first embodiment of the present disclosure.
Figure 2:
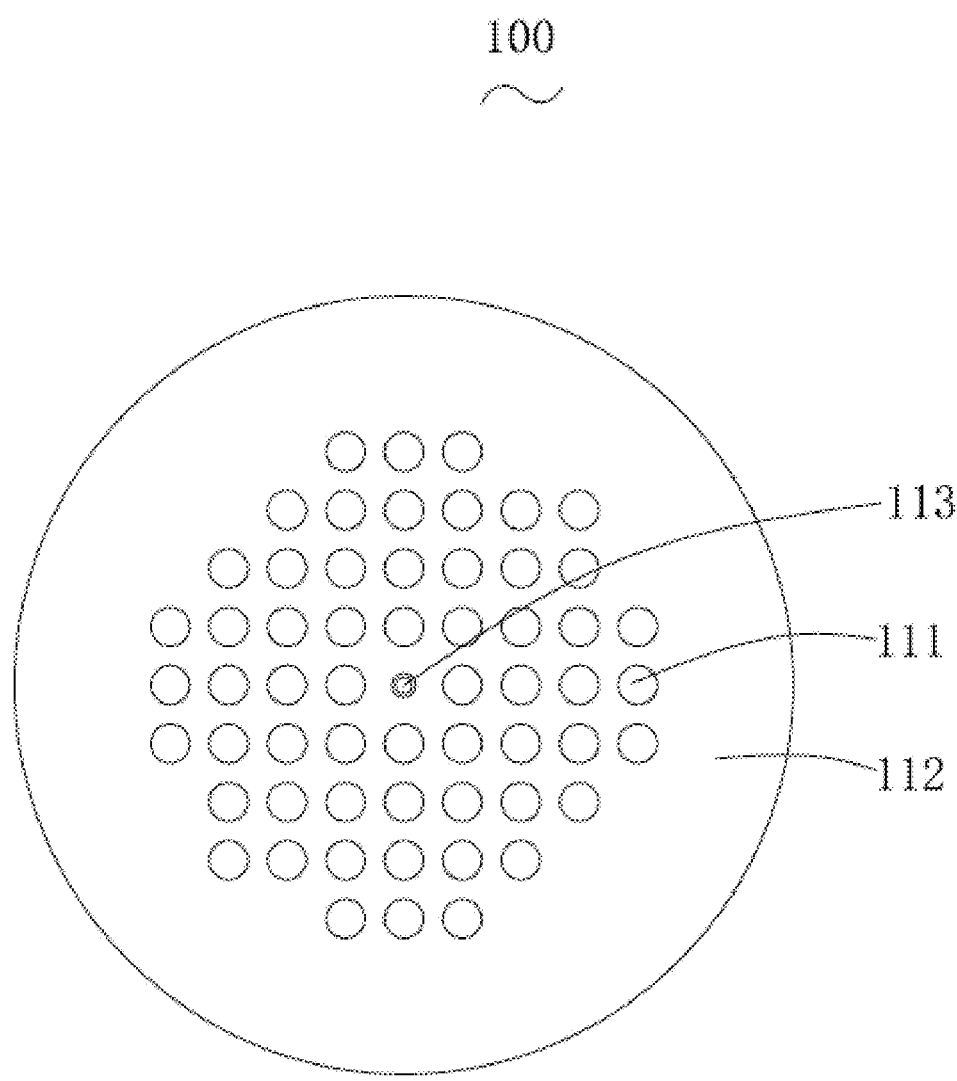
FIG. 2 is a schematic diagram of a structure of a lower mold of the first embodiment of the present disclosure.
Figure 3:
FIG. 3 is a schematic diagram of a structure of an upper mold of the first embodiment of the present disclosure.
Figure 3:
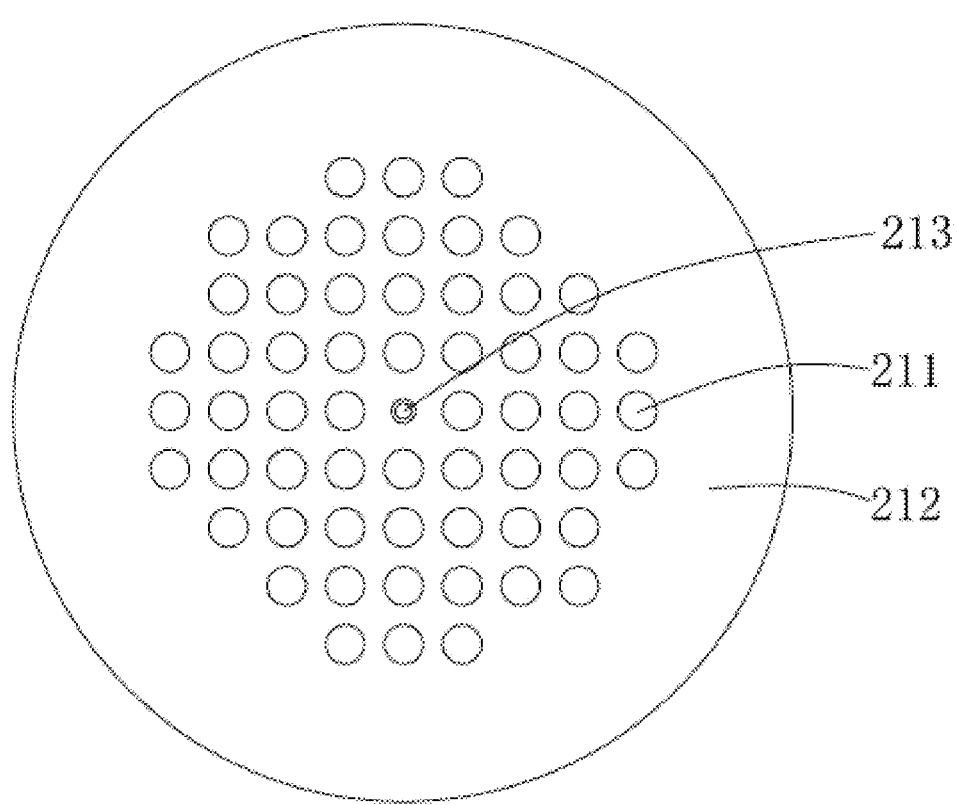
Figure 4:
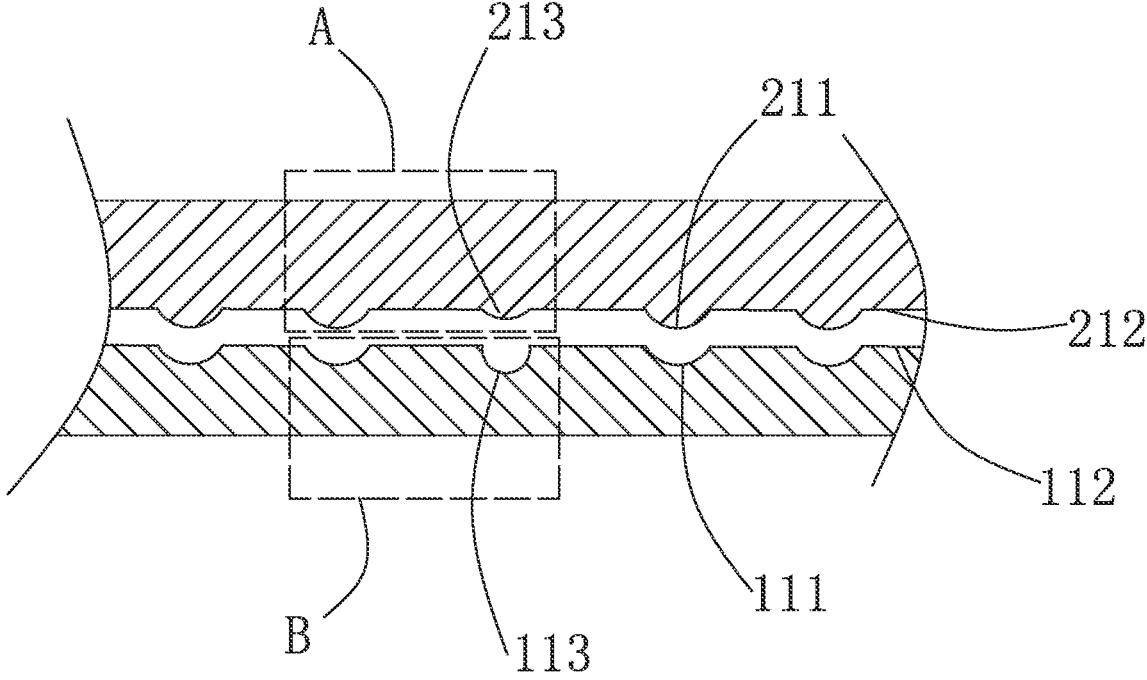
FIG. 4 is a schematic diagram of partial sectional view of the mold when the mold is closed in the first embodiment of the present disclosure.
Figure 5:
FIG. 5 is an enlarged view of part A in FIG. 4.
Figure 5:
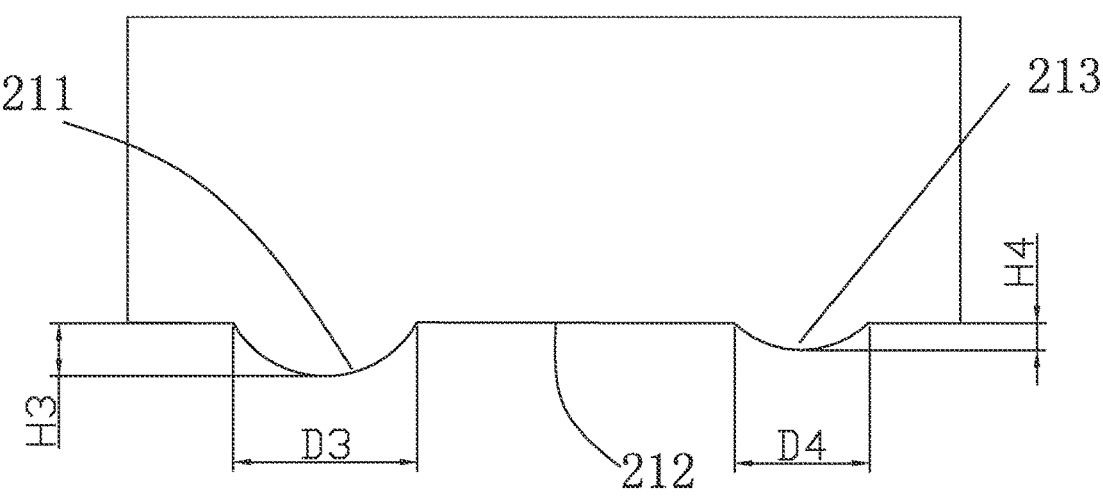
Figure 6:
FIG. 6 is an enlarged view of part B in FIG. 4.
Figure 6:
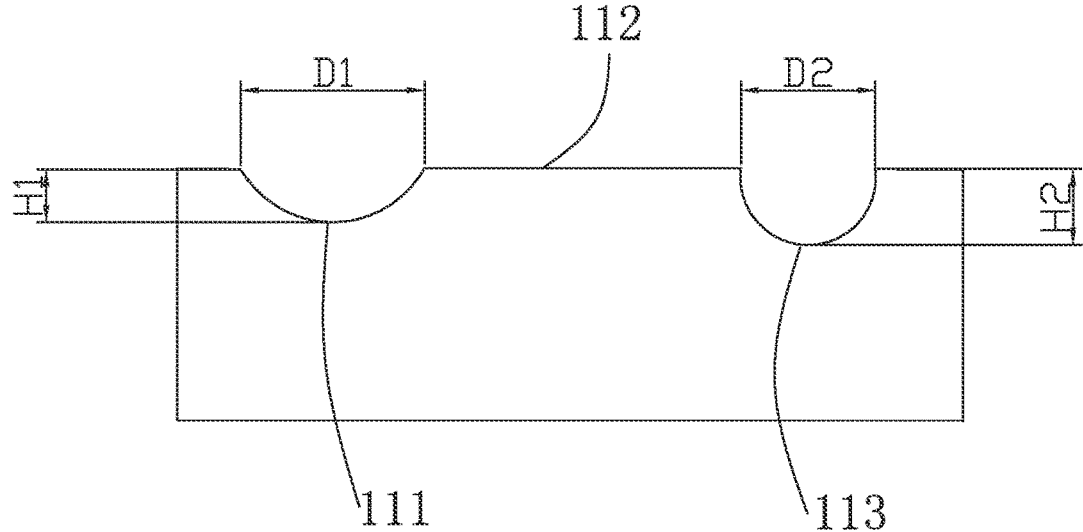

In order to make objects, technical solutions, and advantages of the present disclosure clearer, embodiments of the present disclosure are described in detail with reference to the accompanying drawings in the following text. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

As shown in FIGS. 1-6, the disclosure provides a glass product forming mold 1 comprising a lower mold 100 and an upper mold 200. The lower mold 100 includes a first surface 112 and the upper mold 200 includes a second surface 212. The first surface 112 is located on the side of the lower mold 100 close to the upper mold 200, and the second surface 212 is located on the side of the upper mold 200 close to the lower mold 100. The lower mold 100 includes a first forming portion 111 for forming a glass product, and the first forming portion 111 is formed by bending from the first surface 112. The upper mold includes a second forming portion 211 corresponding to the first forming portion 111, and the second forming portion 211 is formed by bending from the second surface 212. The lower mold 100 includes at least one first effluence portion 113, and the first effluence portion 113 is formed by bending from the first surface 112 and is located on the same side of the first surface 112 as the first forming portion 111. The upper mold 200 includes at least one second effluence portion 213, and the second effluence portion 213 is formed by bending from the second surface 212 and is located on the same side of the second surface 212 as the second forming portion 211. During the forming process, the first forming part 111 and the second forming part 211 are used to form a glass product whose surface features will be copied into the glass product. The first effluence portion 113 and the second effluence portion 213 are used for effluence, thereby releasing excess pressure on the glass substrate 2 during molding, reducing the surface stress of the glass product. The surface of the effluence portions close to the glass substrate 2 is not in complete contact with the glass substrate 2, and a gap is formed between the glass substrate 2 and the effluence portions, which is conducive to demolding, reduces the deformation of the glass product during demolding, and improves the consistency of the glass product. In other optional embodiments, only the upper mold may be provided with an effluence portion, or only the lower mold may be provided with an effluence portion.

In this embodiment, the first forming portion 111 is dented from the first surface 112 along a direction away from the upper mold 200, the first effluence portion 113 is dented from the first surface 112 along a direction away from the upper mold 200, and a dent depth H2 of the first effluence portion 113 is greater than a dent depth H1 of the first forming portion 111. In this way, a larger gap can be obtained between the first effluence portion and the glass substrate, which is more conducive to demolding. In other optional embodiments, the first forming portion and the first effluence portion may also both bulge from the first surface along a direction close to the upper mold, and the bulge height of the first effluence portion is smaller than that of the first forming portion.

In this embodiment, the second forming portion 211 bulge from the second surface 212 along a direction close to the lower mold 100, the second effluence portion 213 bulge from the second surface 212 along a direction close to the lower mold 100, and a bulge height H4 of the second effluence portion 213 is smaller than a bulge height H3 of the second forming portion 211. In this way, a larger gap can be obtained between the second effluence portion and the glass substrate, which is more conducive to demolding. In other optional embodiments, both the second forming portion and the second effluence portion may also be dent from the second surface along a direction away from the lower mold, and the dent depth of the second effluence portion is greater than that of the second forming portion.

In this embodiment, viewed from a direction perpendicular to the first surface 112, the connection between the first effluence portion 113 and the first surface 112 is circular, and on the first surface 112, a diameter D2 of the first effluence portion 113 is smaller than a diameter D1 of the first molding portion 111. Setting it as a circle is consistent with the shape of the mold, and the force in all directions is uniform, which is better for improving the demolding effect. Setting a smaller diameter allows more efficient use of the mold surface, increasing the yield of glass products. In other optional embodiments, the diameter D2 of the first effluence portion may also be greater than or equal to the diameter D1 of the first forming portion.

In this embodiment, viewed from a direction perpendicular to the second surface 212, the connection between the second effluence portion 213 and the second surface 212 is circular, and on the second surface 212, a diameter D4 of the second effluence portion 213 is smaller than a diameter D3 of the second molding portion 211. Setting it as a circle is consistent with the shape of the mold, and the force in all directions is uniform, which is better for improving the demolding effect. Setting a smaller diameter allows more efficient use of the mold surface, increasing the yield of glass products. In other optional embodiments, the diameter D4 of the second effluence portion may also be greater than or equal to the diameter D3 of the second forming portion.

In this embodiment, the first effluence portion 113 is provided at the center of the first surface 112, and the second effluence portion 213 is provided at the center of the second surface 212. During molding, the pressure at the center of the mold is the largest, and arranging the first effluence portion and the second effluence portion at the center can better relieve the pressure and improve the demolding performance. In other optional embodiments, a plurality of first effluence portions may be provided, and the plurality of first effluence portions are centrally arranged at the center of the first surface to improve the pressure release capability at the center. In the same way, a plurality of second effluence parts can also be provided, and the plurality of second effluence parts are centrally arranged at the center of the second surface.

Figure 7:
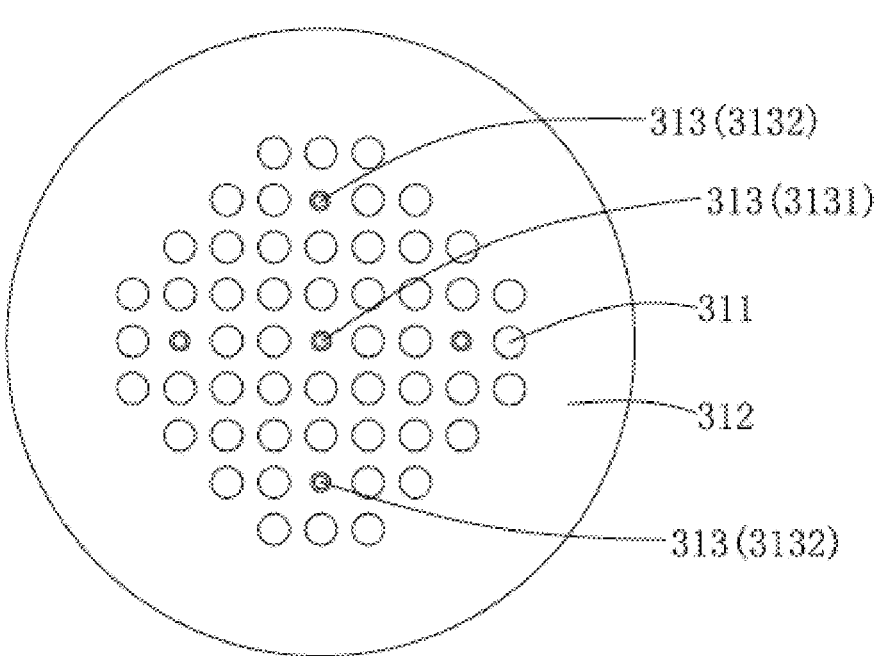
FIG. 7 is a schematic diagram of a structure of a lower mold of a second embodiment of the present disclosure.
Figure 8:
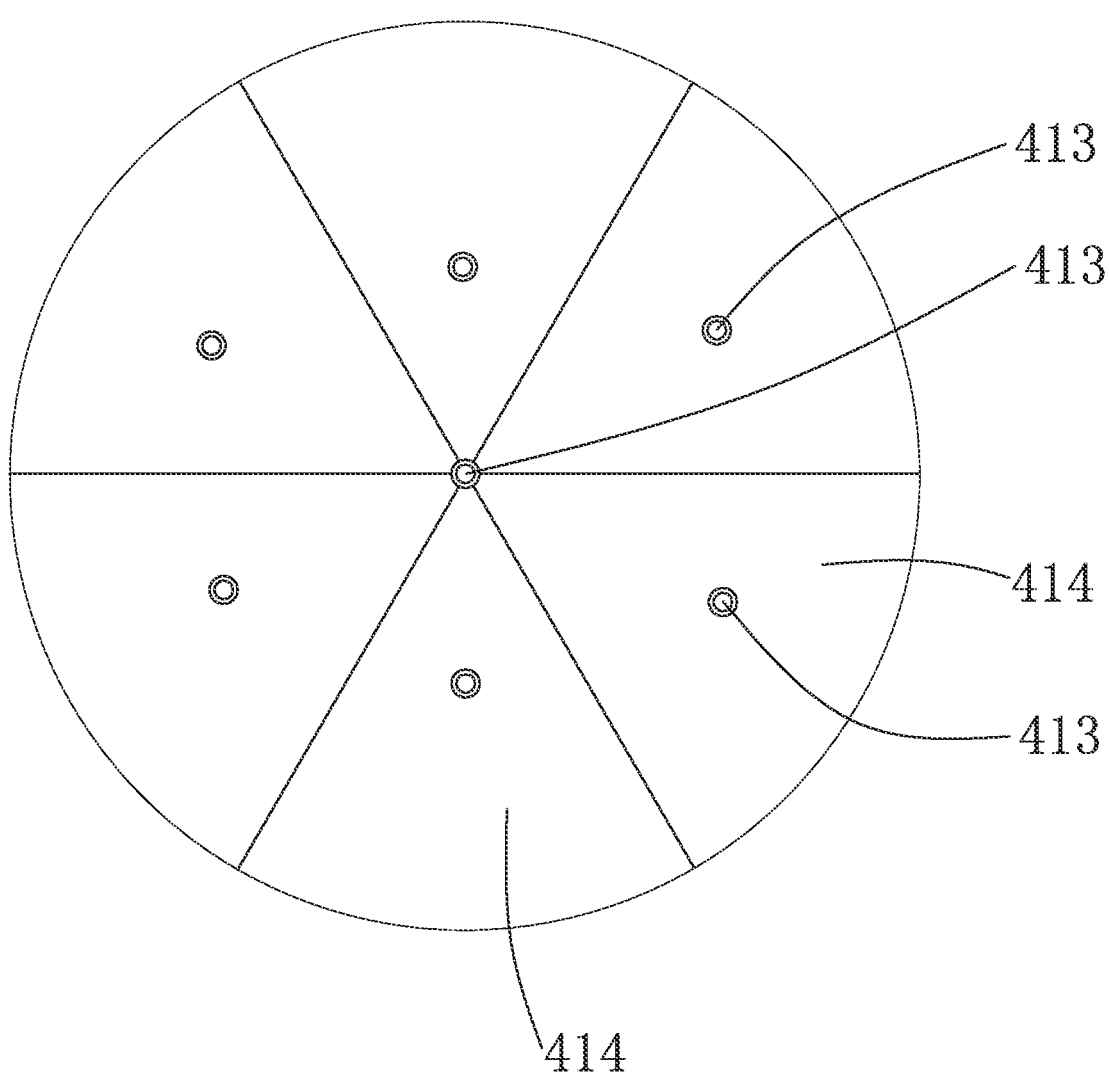
FIG. 8 is a schematic diagram of a structure of a lower mold of a third embodiment of the present disclosure.

FIG. 7 shows a lower mold 300 in a second embodiment, and the structure of the corresponding upper mold is omitted in the drawings. the number of the first effluence portions 313 is multiple, a central first effluence portion 3131 is arranged at the center of the first surface 312, and four peripheral first effluence portions 3132 are arranged at equal intervals on a circular path taking the center of the first surface 312 as a center of circle. The central first effluence portion and the peripheral first effluence portions work simultaneously from multiple positions of the mold, and the effect is better. It can be seen that, correspondingly, the number of the second effluence portions may also be multiple, and a central second effluence portion is arranged at the center of the second surface, and the peripheral second effluence portions are arranged at equal intervals on a circular path taking the center of the second surface as a center of circle.

In this embodiment, viewed from the direction perpendicular to the first surface 312, the connection between the first effluence portion 313 and the first surface 312 is circular. Diameters of the peripheral first effluence portions 3132 is smaller than a diameter of the central first effluence portion 3131. The pressure during molding decreases from the center to the periphery. This setting can effectively balance the pressure between the center and the periphery and further improve the demolding consistency. Similarly, it can be seen that, correspondingly, viewed from the direction perpendicular to the second surface, the second effluence portion's connection to the second surface is circular, and the diameter on the second surface of the peripheral second effluence portions is smaller than that of the central second effluence portion.

Figure 9:
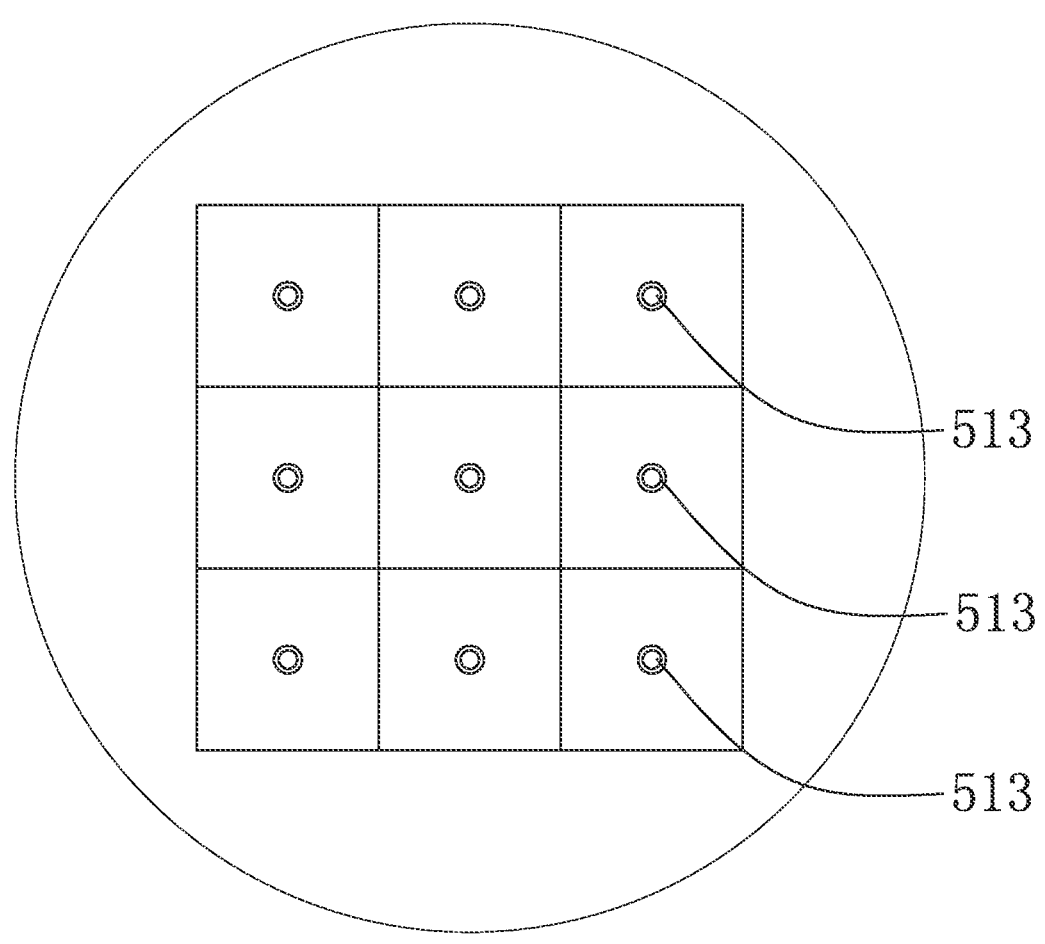
FIG. 9 is a schematic diagram of a structure of a lower mold of a fourth embodiment of the present disclosure.

FIG. 9 shows a lower mold 500 in a fourth embodiment, and the structure of the corresponding upper mold is omitted in the drawings. The difference from the third embodiment is the arrangement of the sub-forming regions. In this embodiment, the sub-forming regions are arranged in a matrix. This arrangement has advantages in the cutting process after the forming. The formed glass substrate can be firstly divided into rectangles of the same size, and then each rectangle can be subdivided and cut.

Compared with the related arts, the forming mold of the glass product of the present disclosure is provided with a effluence portion to release the excess pressure in the forming process, and reduce the surface stress of the glass product. At the same time, gap is formed between the glass substrate and the surface of the mold, which reduces the resistance during demolding and improves the consistency of the glass product.

It can be understood by one having ordinary skill in the art that the above-mentioned embodiments are specific embodiments of the present disclosure. In practical applications, various modifications can be made to these embodiments in forms and details without departing from the spirit and scope of the present disclosure.

What is claimed is:

1. A glass product forming mold, comprising:
   a lower mold comprising a first surface and an upper mold comprising a second surface, the first surface located on a side of the lower mold facing the upper mold, the second surface located on a side of the upper mold facing the lower mold;
   the lower mold including a plurality of first forming portions for forming glass products, the plurality of first forming portions formed by bending from the first surface, the upper mold including a plurality of second forming portions formed by bending from the second surface, and each of the glass products being formed between each of the first forming portions and each of the second forming portions directly opposite it;
   wherein the lower mold includes a plurality of first effluence portions, each being formed by bending from the first surface and located on the same side of the first surface as the plurality of first forming portions, and the upper mold includes a plurality of second effluence portions, each being formed by bending from the second surface and located on the same side of the second surface as the plurality of second forming portions;
   wherein viewed from a direction perpendicular to the first surface, every first effluence portion's connection to the first surface is circular, every first forming portion's connection to the first surface is circular, a diameter of each of the plurality of first effluence portion on the first surface is smaller than diameters of all of the plurality of first forming portions, every first effluence portion does not overlap with all of the plurality of first forming portions for convenience of cutting the glass products, and viewed from a direction perpendicular to the second surface, every second effluence portion's connection to the second surface is circular, every second forming portion's connection to the second surface is circular, a diameter of each of the plurality of second effluence portion on the second surface is smaller than diameters of all of the plurality of the second forming portions, every second effluence portion does not overlap with all of the plurality of second forming portions for convenience of cutting the glass products;
   wherein the plurality of first effluence portions comprises a central first effluence portion arranged at the center of the first surface and at least four peripheral first effluence portions arranged at equal intervals on a circular path taking the center of the first surface as a center of circle, diameters on the first surface of the at least four peripheral first effluence portions are smaller than a diameter on the first surface of the central first effluence portion; the plurality of second effluence portions comprises a central second effluence portion arranged at the center of the second surface and at least four peripheral second effluence portions arranged at equal intervals on a circular path taking the center of the second surface as a center of circle, diameters on the second surface of the at least four peripheral second effluence portions are smaller than a diameter on the second surface of the central second effluence portion.

2. The glass product forming mold according to claim 1, wherein the plurality of first forming portions and the plurality of first effluence portions bulge from the first surface along a direction toward the upper mold, and a bulge height of each of the plurality of first effluence portions is smaller than bulge heights of all of the plurality of first forming portions.

3. The glass product forming mold according to claim 1, wherein the plurality of first forming portions and the plurality of first effluence portions dent from the first surface along a direction away from the upper mold, and a dent depth of each of the plurality of first effluence portions is greater than dent depths of all of the plurality of first forming portions.

4. The glass product forming mold according to claim 1, wherein the plurality of second forming portions and the plurality of second effluence portions bulge from the second surface along a direction toward the lower mold, and a bulge height of each of the plurality of second effluence portions is smaller than bulge heights of all of the plurality of second forming portions.

5. The glass product forming mold according to claim 1, wherein the plurality of second forming portions and the plurality of second effluence portions dent from the second surface along a direction away from the lower mold, and a dent depth of each of the plurality of second effluence portions is greater than dent depths of all of the plurality of second forming portions.

\*   \*   \*   \*   \*